United States Patent
Han

(10) Patent No.: US 8,226,447 B2
(45) Date of Patent: Jul. 24, 2012

(54) UNINTERRUPTIBLE POWER SUPPLY MODULE UNIT

(75) Inventor: Jung-Yup Han, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 38 days.

(21) Appl. No.: 12/887,441

(22) Filed: Sep. 21, 2010

(65) Prior Publication Data

US 2011/0124242 A1 May 26, 2011

(30) Foreign Application Priority Data

Nov. 24, 2009 (KR) .......................... 10-2009-0114056

(51) Int. Cl.
*H01R 4/30* (2006.01)
*H01R 4/38* (2006.01)
(52) U.S. Cl. ....................................................... 439/801

(58) Field of Classification Search .................. 439/801, 439/805, 500; 429/159, 121
See application file for complete search history.

(56) References Cited

U.S. PATENT DOCUMENTS 7,022,432 B2 4/2006 Asahina et al.
7,611,798 B2 * 11/2009 Yoon et al. ...................... 429/91

* cited by examiner

*Primary Examiner* — Javaid Nasri
(74) *Attorney, Agent, or Firm* — Knobbe, Martens, Olson & Bear LLP

(57) ABSTRACT

An uninterruptible power supply (UPS) module unit including a storage battery; a unit case to contain the storage battery; a conductive terminal electrically connected to the storage battery, and disposed in the unit case; and an electrode connector partly inserted from the unit case into a hole formed in the conductive terminal, and electrically connecting the conductive terminal to an external device, wherein a slot is formed in the unit case so as to correspond to the conductive terminal and the electrode connector, wherein rotation of the electrode connector is prevented and the electrode connector is not separated from the unit case.

20 Claims, 6 Drawing Sheets

UNINTERRUPTIBLE POWER SUPPLY MODULE UNIT

CROSS-REFERENCE TO RELATED APPLICATIONS

This application claims the benefit of Korean Application No. 10-2009-0114056, filed on Nov. 24, 2009, in the Korean Intellectual Property Office, the disclosure of which is incorporated herein by reference.

BACKGROUND

1. Field

One or more embodiments of the present invention relate to an uninterruptible power supply (UPS) module unit, and more particularly, to an electrode connector of an UPS module unit.

2. Description of the Related Technology

In general, an uninterruptible power supply (UPS) is an apparatus for supplying power, without interruption, to a load, such as a server apparatus or a subway screen-door, demanding constant power. Usually, the UPS is equipped with a storage battery, and the power stored in the storage battery is supplied to the load when a power line that is connected to the UPS, is cut off. The storage battery is charged by a floating charge method by which a charge voltage is set when a plurality of cells are connected in series, and then charging and discharging are repeated in correspondence to a change in a current flowing in the storage battery.

SUMMARY

According to one or more embodiments of the present invention, an uninterruptible power supply (UPS) module unit includes a storage battery; a unit case to contain the storage battery; a conductive terminal electrically connected to the storage battery, and disposed in the unit case; and an electrode connector partly inserted from the unit case into a hole formed in the conductive terminal, and electrically connecting the conductive terminal to an external device, wherein a slot is formed in the unit case so as to correspond to the conductive terminal and the electrode connector wherein rotation of the electrode connector is prevented and the electrode connector is not separated from the unit case.

According to another aspect of the present invention, the electrode connector may include a head part and a body part, a cross-sectional area of the head part may be greater than a cross-sectional area of the body part, the head part may be disposed in the unit case while the body part is inserted into the hole formed in the conductive terminal, and the body part may be disposed to be partly protruded from the unit case.

According to another aspect of the present invention, the head part may have an angled-shape to prevent the rotation of the electrode connector, and the head part may be hexagonal. However, it is understood that the head part may have other shapes and forms.

According to another aspect of the present invention, the conductive terminal may include a conductive plate that is bent once so as to be approximately orthogonal. Alternatively, the conductive terminal may include a conductive plate having a flat-shape.

According to another aspect of the present invention, the UPS module unit may further include a connecting member to fix a bus bar that is electrically connected to and inserted into the body part of the electrode connector. Here, the connecting member may be a bolt that is screw-coupled to the body part of the electrode connector, and the connecting member may further include a washer disposed between the bolt and the bus bar.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
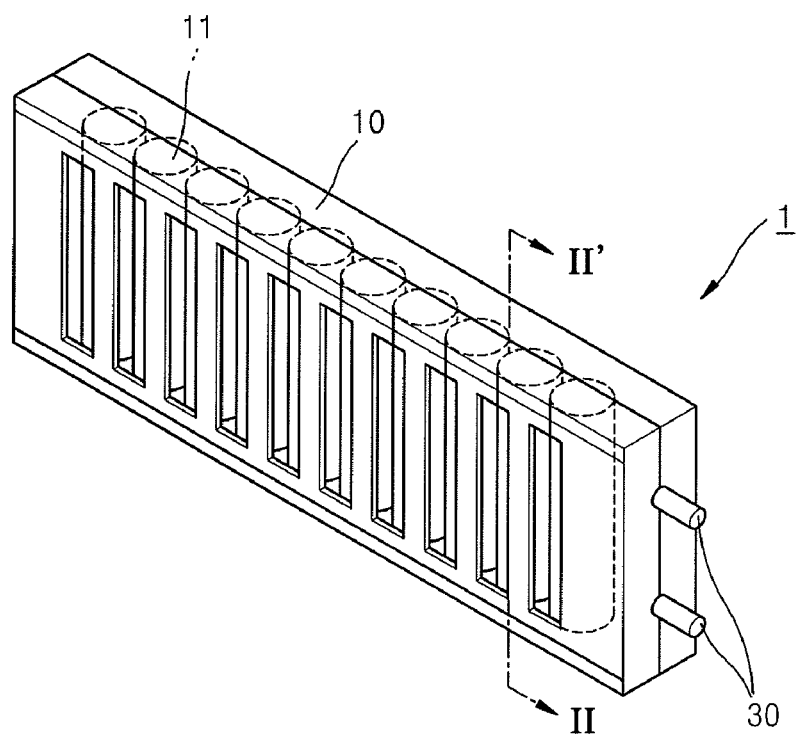
FIG. 1 is a perspective view of an uninterruptible power supply (UPS) module unit according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
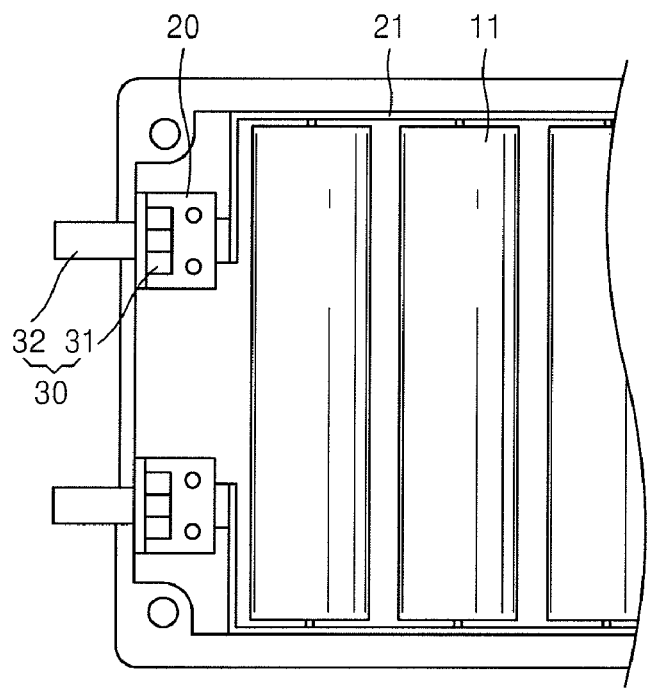
FIG. 2 is a cross-sectional view of the UPS module unit of FIG. 1, taken along a line II-II'.
Figure 3A:
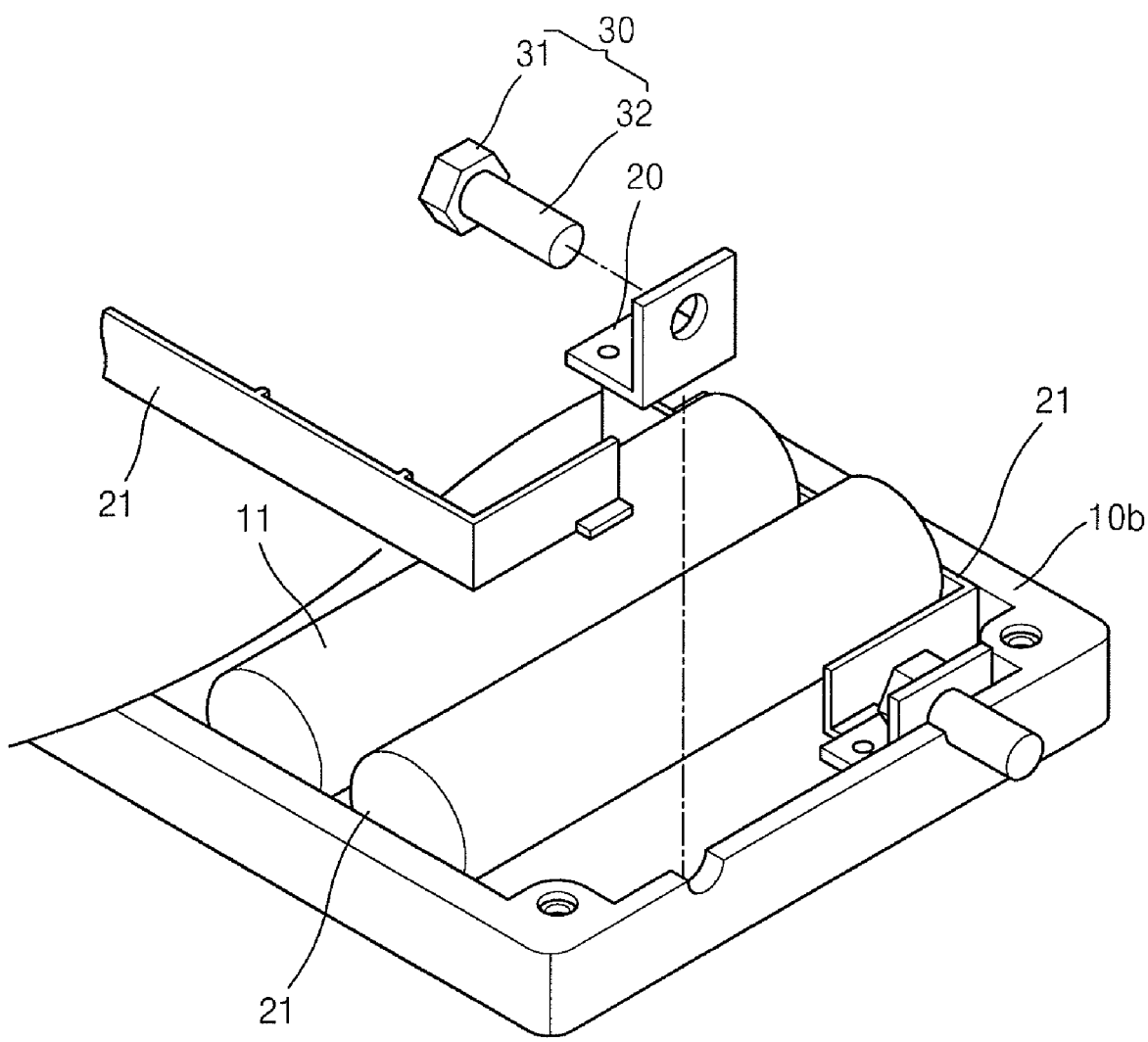
FIG. 3A is an exploded perspective view of a unit case in which an electrode connector and a first conductive terminal are disposed according to the embodiment of FIG. 2.
Figure 3B:
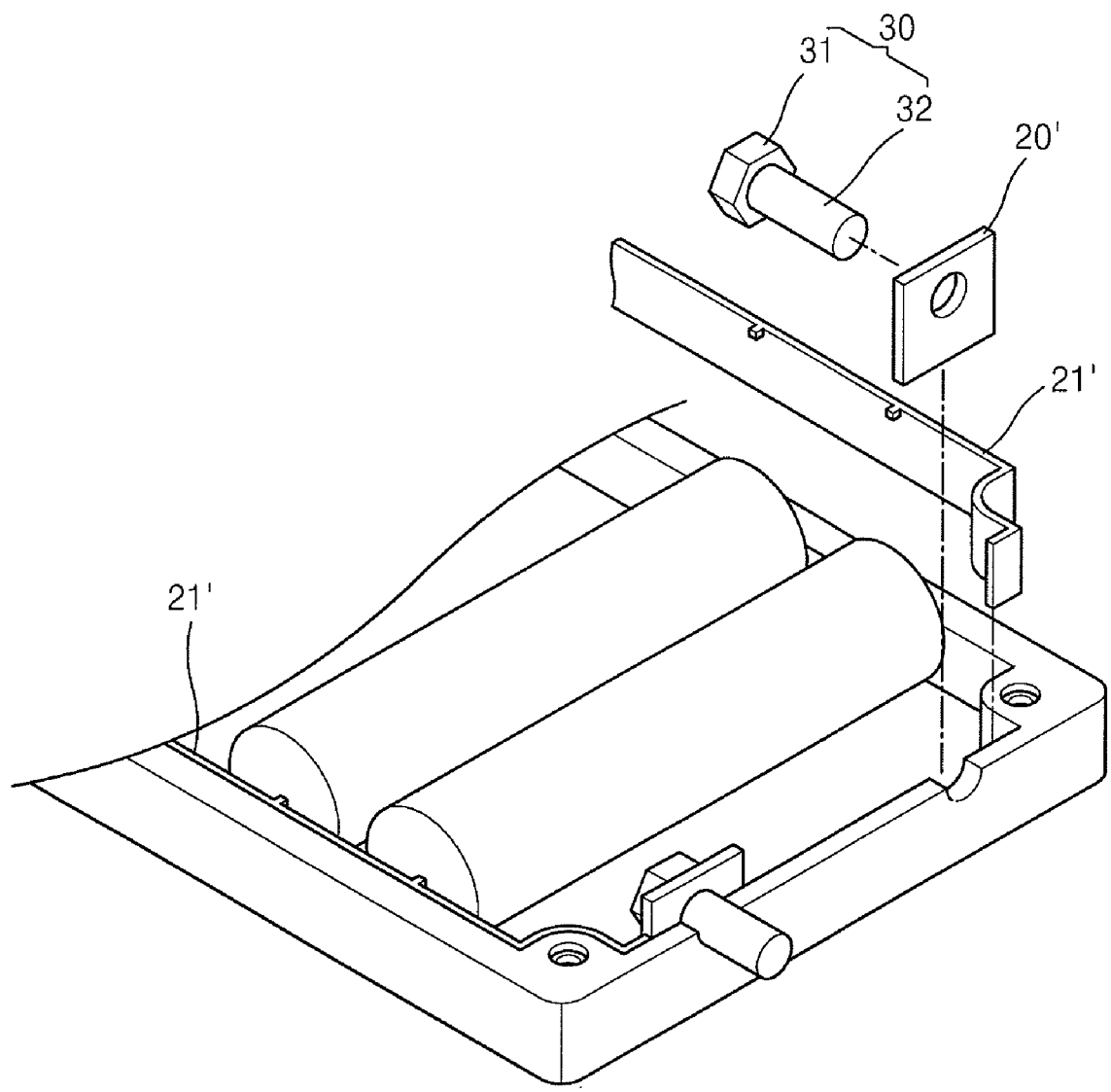
FIG. 3B is an exploded perspective view of a unit case in which an electrode connector and a second conductive terminal are disposed according to another embodiment.
Figure 3C:
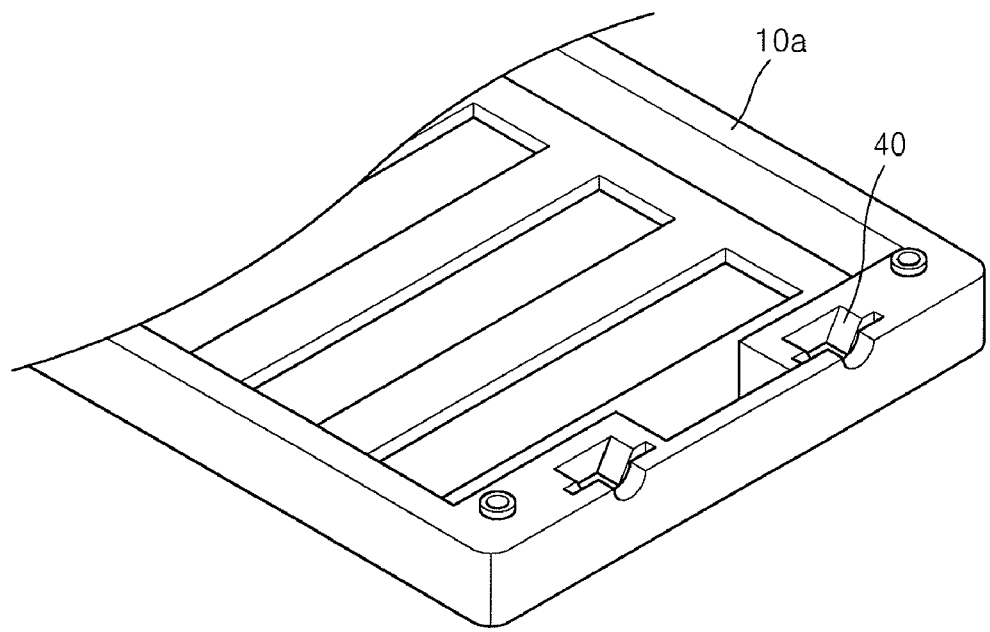
FIG. 3C is a perspective view of a unit case that is engraved in correspondence to the unit case of FIG. 3A.
Figure 3D:
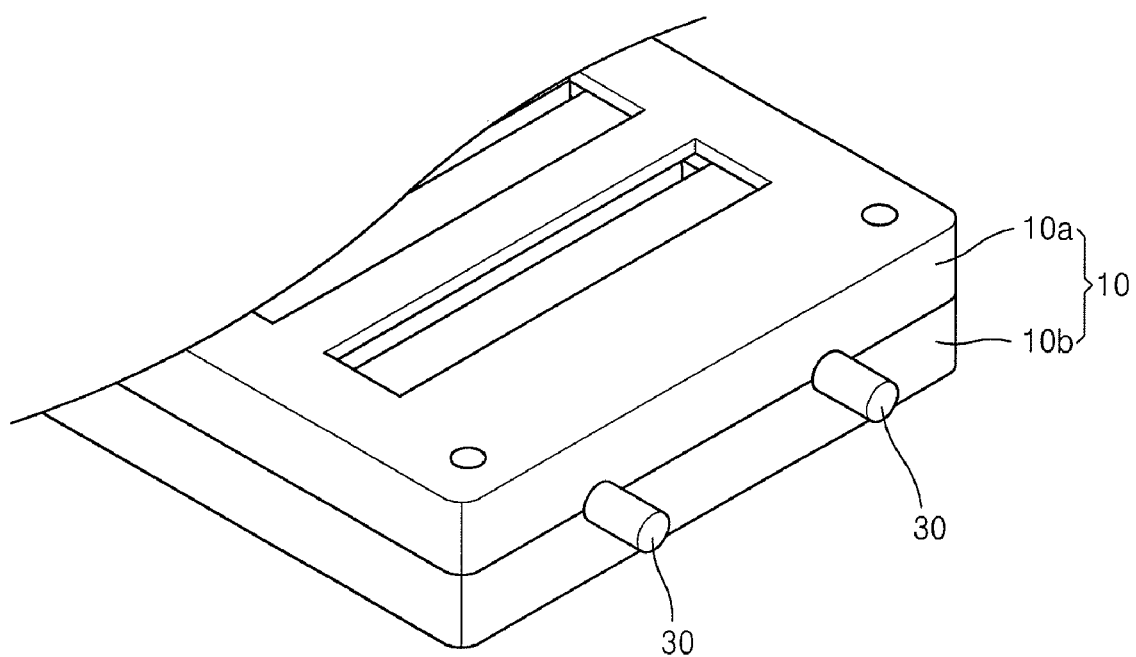
FIG. 3D is a perspective view for showing a combination between the unit case of FIG. 3A and the unit case of FIG. 3C.

An uninterruptible power supply (UPS) module unit 1 according to an embodiment of the present invention will be described with reference to FIGS. 1, 2, and 3A through 3C. FIG. 1 is a perspective view of the UPS module unit 1 according to an embodiment of the present invention. FIG. 2 is a cross-sectional view of the UPS module unit 1, taken along a line II-II' of FIG. 1. FIG. 3A is an exploded perspective view of a unit case in which an electrode connector and a first conductive terminal are disposed according to the embodiment of FIG. 2. FIG. 3B is an exploded perspective view of a unit case in which an electrode connector and a second conductive terminal are disposed according to another embodiment. FIG. 3C is a perspective view of a unit case that is engraved in correspondence to the unit case of FIG. 3A. FIG. 3D is a perspective view for showing a combination between the unit case of FIG. 3A and the unit case of FIG. 3C.

Referring to FIG. 1, the UPS module unit 1 includes a unit case 10, a plurality of storage batteries 11, and an electrode connector 30. Here, the unit case 10 contains the storage batteries 11 that are electrically connected to the electrode connector 30. Electrical connection between each of the storage batteries 11 may be in parallel or in series.

Referring to FIG. 2, each of the storage batteries 11 is electrically connected to the electrode connector 30 via a first conductor 21 and a first conductive terminal 20. Referring to FIG. 3A, the first conductive terminal 20 electrically connects the first conductor 21 and the electrode connector 30. Here, the electrode connector 30 includes a head part 31 and a body part 32, and a cross-sectional area of the head part 31 is greater than a cross-sectional area of a body part 32. The head part 31 of the electrode connector 30 is positioned in the unit case 10, and the body part 32 is inserted into the first conductive terminal 20 and then is connected to an external device. Here, the head part 31 of the electrode connector 30 may have an angled-shape. For example, the head part 31 may have a hexagonal-shape or an octagonal-shape. However, it is understood that the head part 31 may have other shapes and forms. In this manner, since the head part 31 of the electrode connector 30 has the angled-shape, rotation of the electrode connector 30 is prevented by a slot 40 formed in a unit case upper plate 10a, and the electrode connector 30 is not separated from the unit case 10. Here, it is not necessary to separately produce the electrode connector 30 included in the UPS module unit 1, and an existing M5 hexagonal screw or an existing L12 screw may be used, making it possible to reduce manufacturing costs and to increase efficiency with respect to the UPS module unit 1.

Here, the first conductive terminal 20 may have an orthogonal-shape, and may have two ends that may be electrically connected to the first conductor 21 and the electrode connector 30, respectively. However, position and formation of the first conductive terminal 20 are not limited thereto. For example, referring to FIG. 3B, a second conductor 21' may be bent along an inner shape of the unit case 10, and may be connected to a second conductive terminal 20'. Here, the second conductive terminal 20' may have a flat-shape.

Referring to FIG. 3C, the slot 40 is formed in the unit case upper plate 10a, in correspondence to shapes of the first conductive terminal 20 and the electrode connector 30. The slot 40 that is formed in the unit case upper plate 10a is engaged with the angled-shape of the head part 31 of the electrode connector 30 so as to prevent rotation of the electrode connector 30 and to hold the electrode connector 30 in the unit case 10. For convenience of description, it is illustrated that the slot 40 is formed only in the unit case upper plate 10a. However, formation of the slot 40 is not limited thereto, and thus the slot 40 may be formed in the unit case upper plate 10a or in a unit case lower plate 10b.

Referring to FIG. 3D, the unit case upper plate 10a may be coupled with the unit case lower plate 10b, and the body part 32 of the electrode connector 30 may protrude from the unit case 10 so as to be electrically connected to an external device. For example, the externally protruded electrode connector 30 may be connected to a bus bar 50.

Since a plurality of the UPS module units 1 are used by being connected in parallel or in series, stable electrical connection between each of the UPS module units 1 is important. The UPS module units 1 may be electrically connected by using the bus bar 50. The combination between the UPS module unit 1 and the bus bar 50 is described with reference to FIGS. 4 through 6.

Figure 4:
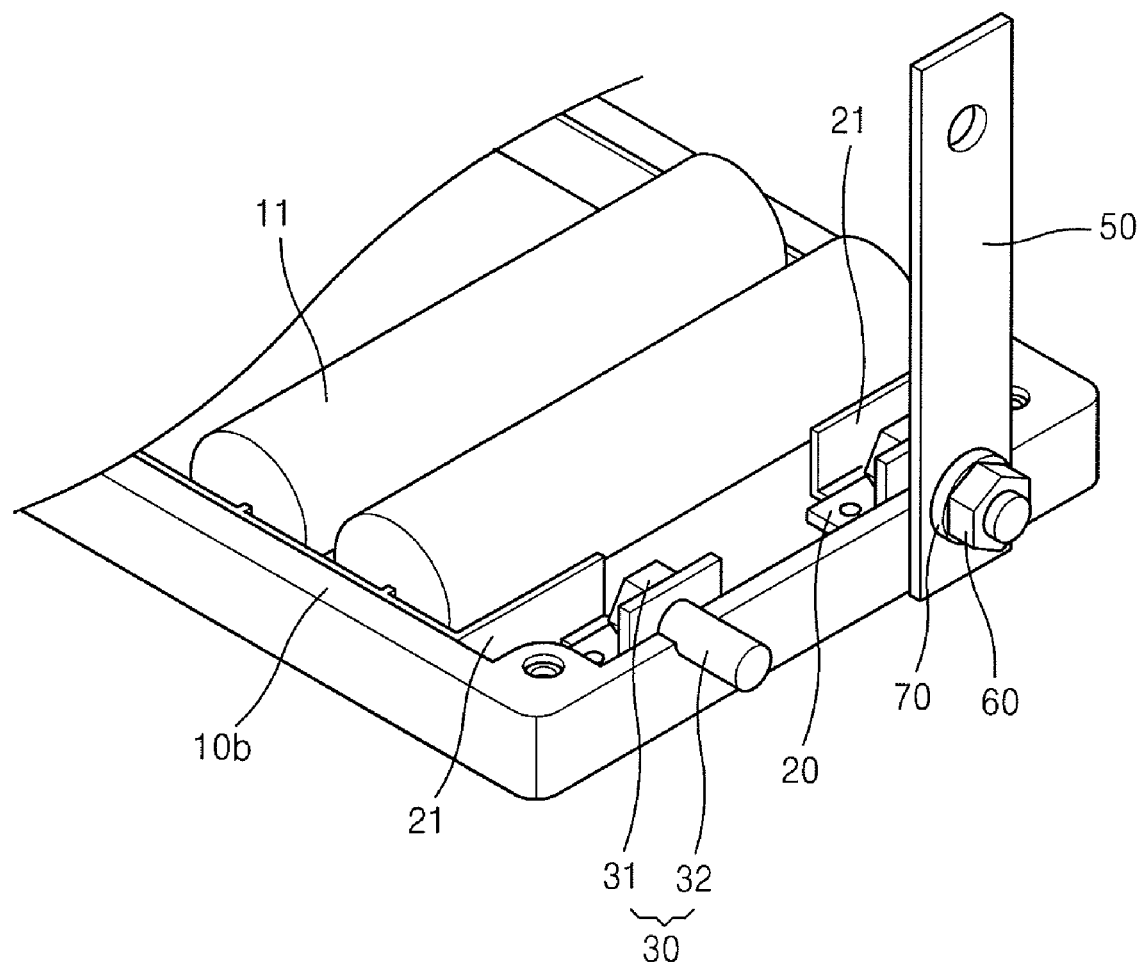
FIG. 4 is a perspective view of a combination between the unit case of FIG. 2 and a bus bar.
Figure 5:
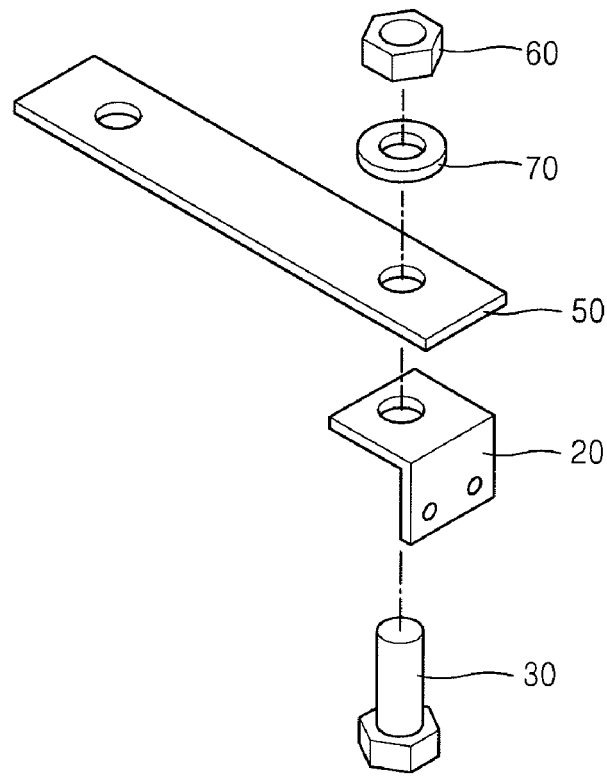
FIG. 5 is an exploded perspective view of a combination status of an electrode connector, a first conductive terminal, and the bus bar.
Figure 6:
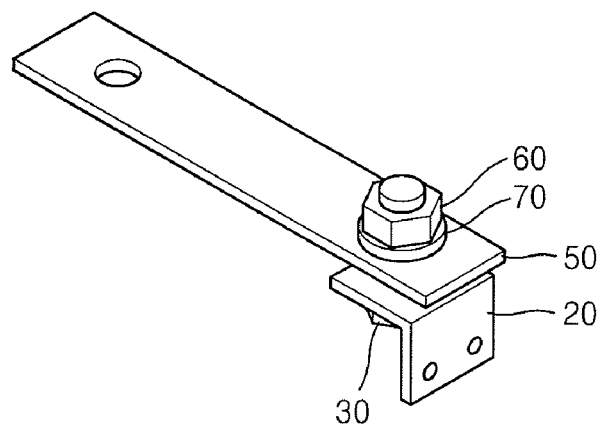
FIG. 6 is a perspective view of a combination example in relation to FIG. 5.

FIG. 4 is a perspective view of a combination between the unit case 10 of FIG. 2 and the bus bar 50. FIG. 5 is an exploded perspective view of a combination status of the electrode connector 30, the first conductive terminal 20, and the bus bar 50. Referring to FIG. 4, the head part 31 of the electrode connector 30 is positioned in the unit case lower plate 10b so as to prevent rotation of the electrode connector 30 via the slot 40 of the unit case upper plate 10a, and to fix and support the electrode connector 30 so that the electrode connector 30 may not fall into the unit case 10 or may not become detached from the unit case 10. The body part 32 of the electrode connector 30 is connected to the bus bar 50, and then is fixed and supported via a connecting member 60. Here, the bus bar 50 may charge the storage batteries 11 by receiving electricity from the external device or may supply electricity to an external device by electrically connecting the electrodes of the UPS module units 1. When the electrode connector 30 is supported and fixed to the bus bar 50 via the connecting member 60, a washer 70 may be disposed between the bus bar 50 and the connecting member 60. FIG. 5 is a diagram for showing a combination order by which the electrode connector 30, the first conductive terminal 20, the bus bar 50, the washer 70, and the connecting member 60 are sequentially combined. Here, the first conductive terminal 20 may be replaced with the second conductive terminal 20', and the washer 70 may be omitted or interposed between the first conductive terminal 20 and the bus bar 50. FIG. 6 is a perspective view of a combination example in relation to FIG. 5.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An uninterruptible power supply (UPS) module unit comprising:
   a storage battery;
   a unit case to contain the storage battery;
   a conductive terminal electrically connected to the storage battery, and disposed in the unit case; and
   an electrode connector partly inserted from the unit case into a hole formed in the conductive terminal, and electrically connecting the conductive terminal to an external device,
   wherein a slot is formed in the unit case so as to correspond to the conductive terminal and the electrode connector, wherein rotation of the electrode connector is prevented and the electrode connector is not separated from the unit case, and wherein the slot is configured to receive the electrode connector.

2. The UPS module unit of claim 1, wherein the electrode connector comprises a head part and a body part, wherein a cross-sectional area of the head part is greater than a cross-sectional area of the body part, wherein the head part is disposed in the unit case while the body part is inserted into the hole formed in the conductive terminal, and wherein the body part is disposed in the slot so as to be partly protruded from the unit case.

3. The UPS module unit of claim 2, wherein the head part has an angled-shape to prevent the rotation of the electrode connector.

4. The UPS module unit of claim 3, wherein the head part is hexagonal.

5. The UPS module unit of claim 1, wherein the conductive terminal is a conductive plate that is bent once so as to be approximately orthogonal.

6. The UPS module unit of claim 1, wherein the conductive terminal is a conductive plate having a flat-shape.

7. The UPS module unit of claim 1, further comprising a connecting member to fix a bus bar that is electrically connected to and inserted into the body part of the electrode connector.

8. The UPS module unit of claim 7, wherein the connecting member is a nut that is screw-coupled to the body part of the electrode connector, and further comprising a washer disposed between the nut and the bus bar.

9. The UPS module unit of claim 1, wherein the electrode connector comprises a head part and a body part, and wherein the head part is inserted into the slot.

10. An uninterruptible power supply (UPS) module unit comprising:
- a storage battery;
- a unit case to contain the storage battery;
- a conductive terminal electrically connected to the storage battery, and disposed in the unit case; and
- an electrode connector protruding from the unit case and partly inserted into a hole formed in the conductive terminal, and electrically connecting the conductive terminal to an external device,
- wherein a slot is formed in the unit case and has a shape that is complementary to the conductive terminal and the electrode connector, and wherein the slot is configured to receive the electrode connector.

11. The UPS module unit of claim 10, wherein the electrode connector comprises a head part and a body part, wherein a cross-sectional area of the head part is greater than a cross-sectional area of the body part.

12. The UPS module unit of claim 11, wherein the head part has an angled-shape that is complementary to a shape of the slot in order to prevent rotation of the electrode connector.

13. The UPS module unit of claim 11, wherein the head part has a hexagonal shape complementary to a shape of the slot in order to prevent rotation of the electrode connector.

14. The UPS module unit of claim 11, wherein the head part is disposed in the unit case while the body part is inserted into the hole formed in the conductive terminal, and the body part partly protrudes from the unit case.

15. The UPS module unit of claim 10, further comprising a connecting member to fix a bus bar that is electrically connected to and inserted into the body part of the electrode connector.

16. The UPS module unit of claim 15, wherein the connecting member is a nut that is screw-coupled to the body part of the electrode connector, and further comprising a washer disposed between the nut and the bus bar.

17. The UPS module unit of claim 10, wherein the electrode connector comprises a head part and a body part, and wherein the head part is inserted into the slot.

18. An uninterruptible power supply (UPS) module unit comprising:
- a storage battery;
- a unit case to contain the storage battery;
- a conductive terminal electrically connected to the storage battery, and disposed in the unit case; and
- an electrode connector including a head part and a body part, wherein a portion of the body part protrudes from the unit case and is partly inserted into a hole formed in the conductive terminal, and electrically connects the conductive terminal to an external device,
- wherein a slot is formed in the unit case and has a shape that is complementary to the conductive terminal and the electrode connector, and wherein the slot is configured to receive the electrode connector.

19. The UPS module unit of claim 18, wherein a cross-sectional area of the head part is greater than a cross-sectional area of the body part.

20. The UPS module unit of claim 18, wherein the head part is inserted into the slot.

* * * * *